United States Patent

[11] 3,588,161

| [72] | Inventors | Jack L. Sayre<br>Glendora;<br>Robert E. Pace, Long Beach, Calif. |
|------|-----------|-----------|
| [21] | Appl. No | 796,683 |
| [22] | Filed | Feb. 5, 1969 |
| [45] | Patented | June 28, 1971 |
| [73] | Assignee | The United States of America as represented by the Secretary of the Navy |

[54] RECOVERY SNARE
12 Claims, 7 Drawing Figs.

[52] U.S. Cl. .................................................. 294/19,
294/66, 294/74, 43/87, 119/153
[51] Int. Cl. ....................................................... B66c 1/12
[50] Field of Search.................................................. 254/186;
294/19, 74, 78, 113, 66, 75; 119/153, 54; 143/87

[56] References Cited
UNITED STATES PATENTS

| 3,402,959 | 9/1968 | Harris........................... | 294/19 |
| 1,540,640 | 6/1925 | Lewis............................ | 43/87 |
| 1,573,878 | 2/1926 | Smith............................ | 294/74 |
| 1,623,774 | 4/1927 | Bell............................... | 119/153 |
| 2,122,264 | 6/1938 | Porter............................ | 119/54 |
| 2,495,804 | 1/1950 | Berchtold..................... | 254/186 |

FOREIGN PATENTS

| 665,003 | 9/1938 | Germany....................... | 254/186 |
| 891,814 | 3/1962 | Great Britain................. | 43/5 |

*Primary Examiner*—Harvey C. Hornsby
*Assistant Examiner*—Merle F. Maffei
*Attorneys*—Justin P. Dunlavey and Ervin F. Johnston ABSTRACT: A recovery snare including a cable, and an elongated element, such as a tube, and a yoke at a snare end of the tube. The yoke may include a pair of hollow longitudinally slanted arms which are pivotally connected to the snare end of the tube. The cable is threaded through the tube and the hollow arms to form a loop at the snare end. The arms of the yoke are provided with means, such as snubbers, for releasably retaining the cable in the arms until such time the cable is looped around and drawn tight on an object to be retrieved.

PATENTED JUN 28 1971

INVENTORS.
JACK L. SAYRE
ROBERT E. PACE
BY
ERVIN F. JOHNSTON
ATTORNEY.

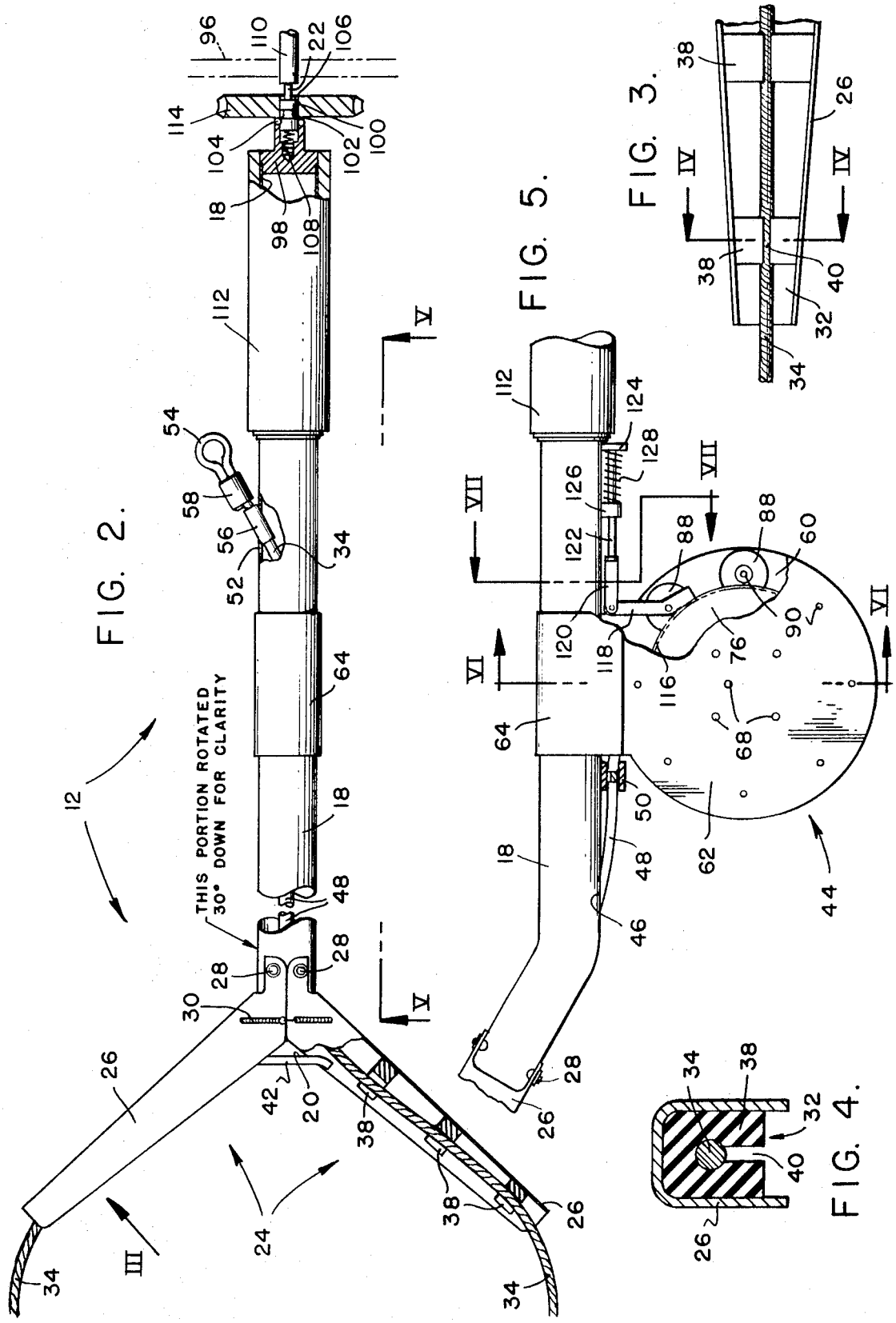

RECOVERY SNARE

The invention described herein may be manufactured and used by or for the Government of the United States of America for governmental purposes without the payment of any royalties thereon or therefor.

Occasionally objects, such as practice torpedoes, or various oceanographic equipment, must be recovered from the ocean floor at depths which are greater than that tolerable for a diver. In order to recover objects from the ocean floor the Navy has provided an unmanned vehicle which is controlled by a surface vessel. This vehicle is commonly known as the cable-controlled underwater research vehicle (CURV). This vehicle is described in U.S. Pat. No. 3,367,299 to Jack L. Sayre, Jr. entitled "Underwater Recovery Vehicle."

The present invention may be adapted for connection to the CURV vehicle for remote operation to recover sunken objects. The CURV vehicle has flood lights and a TV camera for providing a presentation of the ocean floor to the surface vehicle. Upon locating a sunken object, which is to be retrieved, the CURV vehicle is maneuvered and the recovery snare is controlled to place the loop of the snare about the object. The loop is then drawn tight and the object may then be retrieved with the CURV vehicle or the recovery snare may be ejected from the vehicle and retrieved by a separate line from the surface vessel.

An object of the present invention is to provide a recovery snare which can be utilized to efficiently retrieve objects.

Another object is to provide a recovery snare which can be utilized to efficiently retrieve objects from the ocean floor.

A further object is to provide a recovery snare which can be remotely operated to recover irregular objects.

Still another object is to provide a recovery snare with a loop which can be remotely controlled to open and close so that repeated attempts can be made to recover an object which may be irregular in shape.

FIG. 2 is a top view of the recovery snare;

FIG. 3 is a side view of a portion of one of the yoke arms of the recovery snare;

FIG. 4 is a view taken along plane IV-IV of FIG. 3;

FIG. 5 is a side view of the recovery snare;

Figure 1:
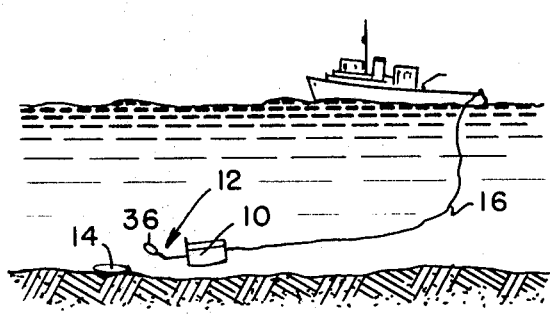
FIG. 1 is a schematic illustration of the recovery snare being operated from a CURV vehicle for retrieval of an object from the ocean floor.

Referring now to the drawings and wherein like reference numerals designate like or similar parts throughout the several views there is shown in FIG. 1 a surface vessel which is remotely controlling a CURV vehicle 10 which is utilizing the recovery snare 12 for the purpose of retrieving a sunken object 14 from the ocean floor. The recovery snare 12 is connected to a control unit of the vehicle 10 which moves the snare to desired positions with respect to the object 14. The control of the vehicle and the snare is effected by a cable 16 which extends between the vehicle 10 and the surface vessel. Flood lights and a TV camera on the vehicle provide a presentation to viewers on the surface vessel for controlling the retrieval of the sunken object 14.

As shown in FIG. 2 the recovery snare includes an elongated element, such as a tube 18, which has a snare end 20 and a control end 22. A yoke assembly 24 is located at the snare end 20 of the tube 18 and includes a pair of arms 26 which are pivotally connected to the snare end by pins 28 which extend through the tube. The arm 26 may be shaped generally like a bell crank so that in a closed position respective legs of the arm 26 engage one another to form the yoke 24. The arms 26 may be biased to a closed yoke position, as shown in FIG. 2, by an extension spring 30 which through both of the arms and is hooked together, as shown in FIG. 2.

As shown in FIGS. 3 and 4 the arms 26 may be hollow and longitudinally slotted at 32. A cable 34 is threaded through the tube 18 and thence through both of the arms 26 to form a loop 36 beyond the yoke 24. The longitudinal slots 32 of the arms 26 should be of a sufficient size to enable entrance and exit of the cable 34 from the arms 26. A retaining means, such as a plurality of rubber snubbers 38, are provided within the arms 26 for transversely retaining a portion of the loop to each arm and releasing the loop portion transversely from the arms when a predetermined transverse force is applied between the cable and the arms. As shown in FIG. 4, the rubber snubbers 38 may slideably envelope the cable 34 except for a slot 40 which has a cross dimension slightly less than the diameter of the cable 34. In this manner the snubber 38 will transversely retain the cable 34 within the arms 26 until such a time that the loop 36 is tightened on an object, whereupon the snubber 38 will expand at the slot 32 and transversely release the cable 34 from the arms 26. The snubbers 38 may be mounted within the arms by any suitable means such as epoxy or rivets. The mounting will orient the slot 40 of the snubber 38 generally in the same direction as the slot 32 of a respective arm 26. In order for the loop 36 to tightly engage an object a bearing plate 42 may be mounted at the snare end 20 of the tube 18.

As shown in FIG. 5, a winch assembly 44, which will be described in detail hereinbelow, may be mounted to the tube 18 at a location below and intermediate its ends. One end of the cable 34 may extend through a bottom wall of the tube 18 at 46, after which it may be connected to the winch assembly 44. In order to guide the cable between one of the arms 26 and the winch assembly 44 a tube 48 may be provided which extends from a location within one of the arms 26, thence through the opening 46 in the wall of the tube 18, and then angled to facilitate winding of the cable on the winch assembly 44. As shown in FIG. 5, a tube retainer 50 may be mounted at the bottom of the tube 18. As shown in FIG. 2 another end of the cable 34 may extend through an opening 52 in a top wall location of the tube 18. This end of the tube may be looped at 54 and fixedly secured to the tube 18 by a tubular boss 56 and a cable clamp 58. The looped end 54 of the cable which may be tied to a line to the surface may be used for recovering the snare and the object after release of the recovery snare from the underwater vehicle.

Figure 6:
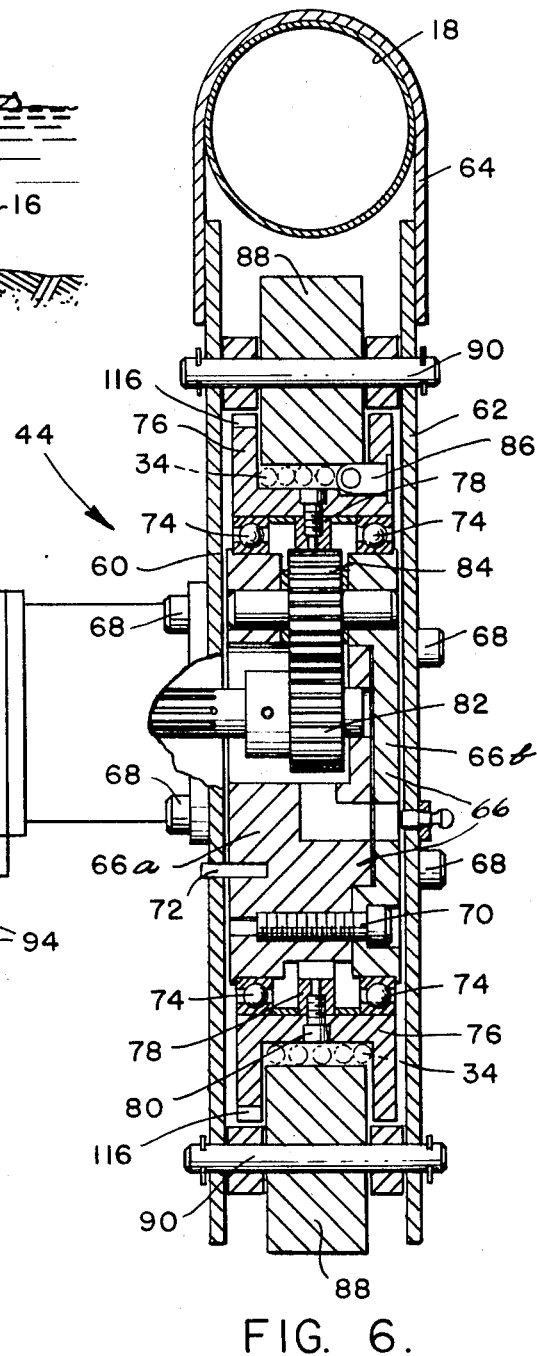
FIG. 6 is a cross-sectional view taken along plane VI-VI of FIG. 5 to show the details of the winch assembly.

It is desirable that the winch assembly 44 be as compact as possible and capable of selectively opening and closing the loop 36 without any binding of the cable 34. The structural arrangement for accomplishing these purposes are shown in FIGS. 5 and 6. The winch assembly 44 may include a pair of spaced-apart plates 60 and 62 which are mounted to the tube 18 by a U-shaped bracket 64. A hub 66, which may be constructed in two separate parts 66a and 66b, is fixedly mounted to and between the pair of plates 60 and 62 by any suitable means such as bolts 68. The hub components 66a and 66b may be further secured together by a bolt 70 and the hub part 66a may be aligned with respect to the plate 60 by a dowel pin 72. Rotatably mounted to the hub 66 by any suitable means, such as bearings 74, is a ring-shaped drum 76. An internal tooth ring gear 78 is mounted to an internal circumference of the drum 76 by any suitable means such as small bolts 80. Rotatably mounted within the hub 66 is a drive gear 82 which is drivingly connected to the ring gear 78. If desired an idler gear 84 may be rotatably mounted within the hub 66 for making driving connection between the driving gear 82 and the ring gear 78. At the top of the drum 76 there may be provided a cable clamp 86 for clamping one end of the cable to the drum 76. In order to ensure winding and unwinding of the cable 34 on the drum 76 without binding of the cable there is provided a plurality of rollers 88 which are located in a spaced relationship about the circumference of the drum 76. These rollers 88 may be rotatably mounted between the plates 60 and 62 by a series of pins 90, and the outer circumferences of the rollers 88 may be spaced from the bottom circumference of the drum 76 at a distance approximately equal to the diameter of the cable 34, so that only one layer of the cable may be wound on the drum 76. We have found that this arrangement prevents any binding of the cable 34 during the winding and unwinding operations.

As shown in FIG. 6, a motor 92 may be fixedly mounted to the plate 60 by the bolts 68 so that the output shaft of the motor is received within the driving gear 82. The motor 92 may be hydraulic and bidirectional and may be controlled by hydraulic lines 94 which are connected to the underwater vehicle. These hydraulic lines 94 may be disconnected by zero leakage quick release connectors (not shown) when the recovery snare 12 is released from the vehicle 10.

The control end 22 of the tube 18 may be releasably connectable to a control unit 96 of the underwater vehicle 10. This control unit and the connection is fully described in the patent to Sayre, Jr., U.S. Pat. No. 3,367,299 which is incorporated by reference herein. The control end 22 of the tube 18 is provided with a plug 98 which slideably receives a cylindrical member 100. The cylindrical member 100 is provided with annular groove 102 which is adapted to receive balls 104 which are slideably disposed within apertures in the plug 98. The cylindrical member 100 is biased toward a retainer 106 by a compression spring 108. When the cylindrical member 100 is sufficiently pushed against the spring 108 the balls 104 will drop within the annular recess 102 to cause a release from the control unit 96. This movement of the cylindrical member 100 against the spring 108 may be effected by a piston rod 110 which is operated by the control vehicle 10. Extending forwardly from the control unit 96 is a tube 112 for receiving the tube 18 of the recovery snare 12. The tube 18 of the recovery snare 12 may be rotated within the control tube 112 by a gear 114 which is operated by means (not shown) on the control vehicle 10.

Figure 7:
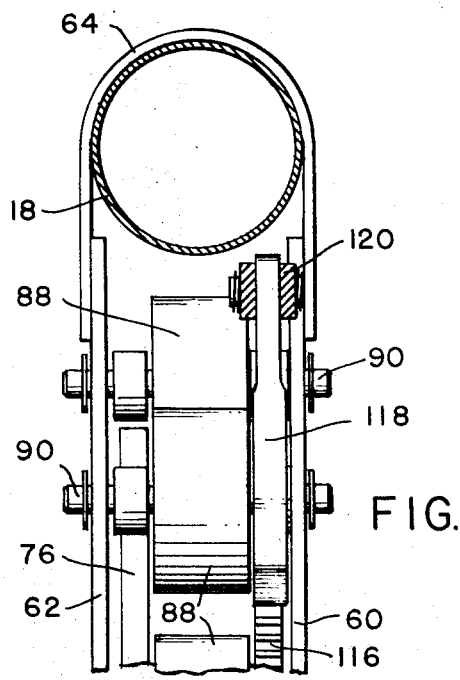
FIG. 7 is a cross-sectional view taken along plane VII-VII of FIG. 5 to show the details of the winch locking means.

It is desirable to lock the winch assembly when the recovery snare 12 is released from the control vehicle. As shown in FIGS. 5 and 7 this may be accomplished by a winch locking means which is mounted to the bottom of the tube 18. The winch locking means may include one edge of the drum 76 having ratchet teeth 116. The locking means may further include a generally bell crank-shaped lever arm 118 which is pivoted intermediate its ends to the winch plate 62 by one of the roller pins 90 so as to be lockingly engageable at one end with the ratchet teeth 116 of the drum. The opposite end of the lever arm 118 is pivotally connected to a fork 120 which in turn is connected to a push rod 122. The opposite end of the rod 122 is provided with a bearing plate 124 for engaging the end of the control unit tube 112 and is slideable along the bottom of the recovery snare tube 18 within a guide 126 which is mounted at the bottom of the tube 18. Between the guide 126 and the bearing plate 124 there is located a compression spring 128 for biasing the rod 122 toward the control unit tube 112. When the recovery snare 12 is connected to the underwater vehicle 10, the control unit tube 112 holds the rod 122 in a forward position so that the end of the lever arm 118 is disengaged with the ratchet teeth 116. When the recovery snare 12 is released from the underwater vehicle 10 of the tube 18 slides from the control unit tube 112 and the rod 122 moves in an aft direction to lock the end of the lever arm 118 with the ratchet teeth 116. In this manner the loop 36 of the cable 34 will retain tight engagement on an object to be retrieved when the recovery snare 12 is released from the underwater vehicle.

In the operation of the present invention the surface vessel controls the movements of the underwater vehicle and the recovery snare 12 until the loop 36 of the cable 34 is positioned around an object to be retrieved from the ocean floor. When the loop 36 is around the object the operators at the surface vessel signal the underwater vehicle to operate the winch assembly 44 via the hydraulic motor lines 94 to close the loop 36 about the object. When the object is brought into engagement with the arms 26 of the yoke 24 the arms 26 spread apart and the cable 34 is released from the snubbers 38. The loop 36 then makes maximum engagement with the object to be retrieved and the object is brought to bear tightly against the bearing plate 42. When the object is properly secured the recovery snare 12 is released from the underwater vehicle and the winch assembly 44 is automatically locked by engagement of the lever arm 118 with the ratchet teeth 116. A line (not shown) from the loop end 54 of the cable 34 may be located at the surface of the water by a float (not shown) for retrieval of the recovery snare 12 and the object by the surface vessel. If for some reason the loop 36 of the cable 34 does not snare the object to be retrieved the underwater vehicle may be signaled to open the loop 36 for another attempt to snare the object. The rollers 88 on the winch assembly 44 as well as the guide tube 48 enable the cable 34 to be unwound and the loop 36 enlarged without any binding of the cable.

Obviously many modifications and variations of the present invention are possible in the light of the above teachings. It is therefore to be understood that within the scope of the appended claims the invention may be practiced otherwise than as specifically described.

We claim:
1. A recovery snare comprising:
a cable;
an elongated element having means which slideably retains said cable;
said cable forming a loop at a snare end of the elongated element;
a yoke;
said yoke including a pair of arms which are pivotally connected to the elongated element at the snare end;
a portion of said loop of cable slideably extending along both arms; and
means mounted to the arms for transversely retaining the loop portion to each arm and releasing the loop portion transversely from the arms when a predetermined transverse force is applied between the cable and said arms.
2. A recovery snare as claimed in claim 1 including:
the loop retaining and releasing means includes a plurality of resilient snubbers;
each resilient snubber slideably enveloping the cable portion and having a slot with a cross dimension slightly less than the diameter of the cable so that when the transverse force is applied the resilient snubbers will expand at the slot and transversely release the cable portion from the arms.
3. A recovery snare as claimed in claim 1 including:
a means biasing said arms toward one another.
4. A recovery snare as claimed in claim 3 including:
a bearing plate mounted at the snare end of said elongated element.
5. A recovery snare as claimed in claim 1 wherein:
the elongated element comprises a tube; and
said cable being threaded through said tube
one end of the cable extends through the wall of the tube and is fixedly attached thereto; and
means mounted to said end of the cable for connection to a lifting line.
6. A recovery snare as claimed in claim 2 including:
each of the arms of the yoke being hollow and longitudinally slotted; and
said resilient snubbers being mounted in the longitudinal slots of the arms with the slot of each snubber oriented in substantially the same direction as the longitudinal slot of the respective arm.
7. A recovery snare as claimed in claim 1 including:
a winch assembly mounted on said elongated element; and
one end of said cable being connected to said winch assembly.
8. A recovery snare as claimed in claim 7 wherein said winch assembly comprises:
a drum;
a plurality of rollers; and
means positioning the rollers in a spaced relationship about the circumference of said drum.
9. A recovery snare as claimed in claim 8 wherein the winch assembly further comprises:
said positioning means for the rollers including a pair of spaced-apart plates;
a hub fixedly mounted to and between said pair of plates;

an internal toothed ring gear mounted to an internal circumference of said drum; and a drive gear rotatably mounted within said hub and drivingly connected to said ring gear.

10. A recovery snare comprising:

a tube having a snare end and a control end;

a yoke which includes a pair of arms which are pivotally connected to the tube at the snare end thereof;

said arms being hollow and longitudinally slotted;

a winch assembly mounted on said tube;

a cable threaded through the tube thence through the arms to form a loop beyond said yoke;

means releasably retaining said cable within said arms;

one end of the cable being fixedly attached to the tube and the other end of the cable extending through the wall of the tube and being attached to the winch assembly;

said winch assembly including:

a pair of spaced-apart plates;

a hub fixedly mounted to and between said pair of plates;

a drum rotatably mounted to said hub;

a plurality of rollers;

means positioning the rollers in a spaced relationship about the circumference of said drum;

an internal toothed ring gear mounted to an internal circumference of said drum; and a drive gear rotatably mounted within said hub and drivingly connected to said ring gear;

the control end of the tube being releasably connectable to a control unit;

means, mounted to the tube and responsive to the release of the tube from the control unit, for locking the winch assembly; and the winch locking means including:

said drum having ratchet teeth;

a ratchet lever arm pivotally connected to one of the winch plates and lockingly engageable with the teeth of said drum;

a rod slidably mounted to the tube and pivotally connected to said lever arm; and means biasing the rod to cause disengagement of the lever arm with the drum teeth.

11. A recovery snare comprising:

a cable;

an elongated element having means which slideably retains said cable;

said cable forming a loop at a snare end of the elongated element;

a yoke;

said yoke including a pair of arms which are pivotally connected to the elongated element at the snare end;

means releasably retaining said cable to said yoke along the pair of arms;

a winch assembly mounted on said elongated element;

one end of said cable being connected to said winch assembly;

said elongated element having an opposite control end which is releasably connectable to a control unit; and means, mounted on said elongated element and responsive to the release of the elongated element from the control unit, for locking the winch assembly.

12. A recovery snare as claimed in claim 11 wherein the winch locking means includes:

a ratchet lever arm pivotally connected to said winch assembly;

a rod slideably mounted to the elongated element and pivotally connected to said lever arm; and means biasing said rod in a direction opposite the snare end of the elongated element.